US012671792B2

(12) United States Patent (10) Patent No.: US 12,671,792 B2
Kobori (45) Date of Patent: Jun. 30, 2026

(54) SPACE COUPLING SYSTEM AND SPACE COUPLING METHOD

(71) Applicant: TOYOTA JIDOSHA KABUSHIKI KAISHA, Toyota (JP)

(72) Inventor: Norimasa Kobori, Tokyo-to (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 191 days.

(21) Appl. No.: 18/597,481

(22) Filed: Mar. 6, 2024

(65) Prior Publication Data

US 2024/0364844 A1 Oct. 31, 2024

(30) Foreign Application Priority Data

Apr. 28, 2023 (JP) ................................. 2023-074506

(51) Int. Cl.
| | |
|---|---|
| *H04N 7/15* | (2006.01) |
| *G05D 1/686* | (2024.01) |
| *G05D 105/30* | (2024.01) |
| *G05D 109/20* | (2024.01) |

(52) U.S. Cl.
CPC ............. *H04N 7/157* (2013.01); *G05D 1/686* (2024.01); *G05D 2105/34* (2024.01); *G05D 2109/20* (2024.01)

(58) Field of Classification Search
CPC ............................ H04N 7/157; G05D 2105/34
See application file for complete search history.

(56) References Cited

U.S. PATENT DOCUMENTS

| | | | |
|---|---|---|---|
| 2019/0098255 A1* | 3/2019 | Bergmann ......... | G06Q 10/1093 |
| 2020/0160055 A1* | 5/2020 | Nakamura ............. | G09B 29/10 |
| 2022/0152493 A1 | 5/2022 | Horita et al. | |

FOREIGN PATENT DOCUMENTS

| | | |
|---|---|---|
| JP | 2020-4284 A | 1/2020 |
| JP | 2022-79362 A | 5/2022 |
| JP | 2022-173028 A | 11/2022 |
| WO | 2009060880 | 5/2009 |

* cited by examiner

*Primary Examiner* — Amal S Zenati
(74) *Attorney, Agent, or Firm* — Oliff PLC

(57) ABSTRACT

A space coupling system for coupling real space with virtual space is provided. A real position in the real space and a virtual position in the virtual space are associated with each other. A first real position is the real position of a real person in the real space or the real position of a screen configured to move following the real person. A first virtual position is the virtual position associated with the first real position and changing in conjunction with the first real position. The space coupling system acquires the first real position and the first virtual position, locates an access point accessible by a virtual person at the first virtual position in the virtual space, and displays or projects information regarding the virtual person or an image of the virtual space around the access point on the screen in the real space.

12 Claims, 11 Drawing Sheets

15A: PROJECTOR
12A: DRONE
13A: MIST SCREEN
11
23A: AVATAR
21: VIRTUAL PERSON
REAL SPACE 10
VIRTUAL SPACE 20

SPACE COUPLING SYSTEM AND SPACE COUPLING METHOD

CROSS-REFERENCES TO RELATED APPLICATION

The present disclosure claims priority to Japanese Patent Application No. 2023-074506, filed on Apr. 28, 2023, the contents of which application are incorporated herein by reference in their entirety.

TECHNICAL FIELD

The present disclosure relates to a technique for coupling real space with virtual space.

BACKGROUND ART

Patent Literature 1 discloses a communication system in which a plurality of terminals connected to a network share virtual space. In real space, an area terminal is installed for each predetermined area. The area terminal displays a video of a virtual character in a virtual area. On the other hand, a virtual display is installed in the virtual area. The virtual display displays a video of a real space user.

LIST OF RELATED ART

Patent Literature 1: International Publication WO 2009/060880

SUMMARY

Coupling real space with virtual space is important in promoting communication, business, and the like. Here, a real person in the real space may desire to experience the virtual space in conjunction with his or her movement while moving freely, rather than using a device installed at predetermined position.

An object of the present disclosure is to provide a technique capable of coupling real space with virtual space in conjunction with movement of a real person in the real space.

A first aspect relates to a space coupling system for coupling real space with virtual space.

A real position in the real space and a virtual position in the virtual space are associated with each other.

The space coupling system includes one or more processors.

The one or more processors acquire a first real position that is the real position of a real person in the real space or the real position of a screen configured to move following the real person.

The one or more processors acquire a first virtual position that is the virtual position associated with the first real position and changing in conjunction with the first real position.

The one or more processors locate an access point, which is accessible by a virtual person in the virtual space, at the first virtual position in the virtual space.

The one or more processors display or project information of the virtual person or an image of the virtual space around the access point on the screen in the real space.

A second aspect relates to a space coupling method for coupling real space with virtual space. The space coupling method is executed by a computer.

A real position in the real space and a virtual position in the virtual space are associated with each other.

The space coupling method includes:

acquiring a first real position that is the real position of a real person in the real space or the real position of a screen configured to move following the real person;

acquiring a first virtual position that is the virtual position associated with the first real position and changing in conjunction with the first real position;

locating an access point, which is accessible by a virtual person in the virtual space, at the first virtual position in the virtual space; and displaying or projecting information of the virtual person or an image of the virtual space around the access point on the screen in the real space.

According to the present disclosure, the real position in the real space and the virtual position in the virtual space are associated with each other. In addition, the screen that moves following the real person is provided in the real space. On the other hand, the access point accessible by the virtual person is located at the first virtual position associated with the real position of the real person or the screen. The information of the virtual person or the image of the virtual space around the access point is displayed or projected on the screen in the real space. When the real person moves in the real space, the access point also moves in the virtual space in conjunction with the movement of the real person. Since the access point moves in the virtual space, the information displayed or projected on the screen in the real space also changes in conjunction with the movement. In this manner, the real space and the virtual space are coupled (linked) with each other so as to be in conjunction with the movement of the real person in the real space. As a result, the real person is able to feel as if he or she is actually moving in the virtual space. That is, the real person is able to experience the virtual space in conjunction with his or her movement while moving freely without using a device installed at a predetermined position.

DETAILED DESCRIPTION

Embodiments of the present disclosure will be described with reference to the accompanying drawings.

1. Example of Coupling Between Real Space and Virtual Space

Figure 1:
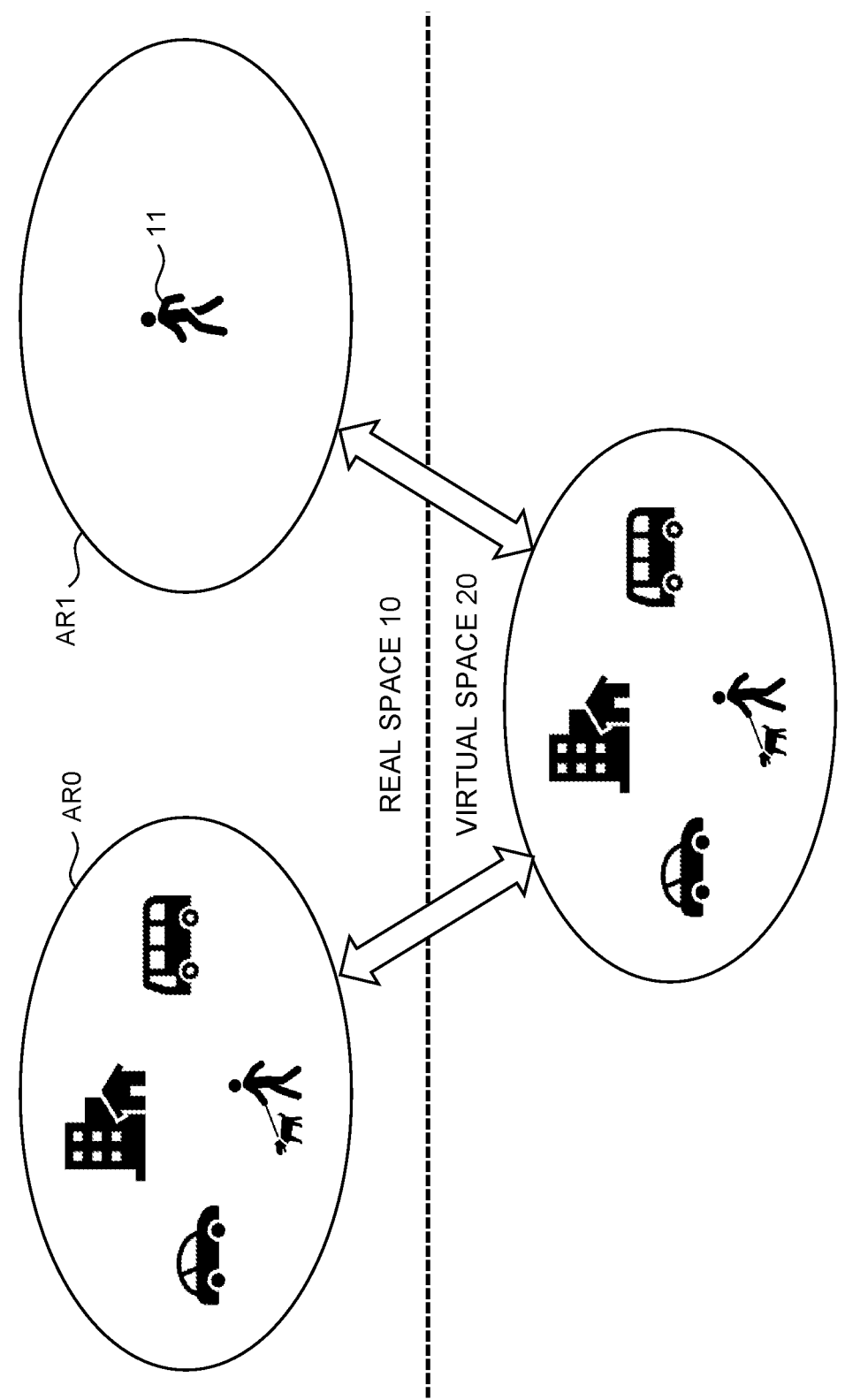
FIG. 1 is a conceptual diagram for explaining an example of real space and virtual space.

FIG. 1 is a conceptual diagram for explaining an example of real space 10 and virtual space 20. A certain area AR0 is present in the real space 10. For example, the area AR0 is a town, a building, or the like. The area AR0 is reproduced in the virtual space 20 by DigitalTwin technique or the like. Meanwhile, another area AR1 is present at a position away from the area AR0 in the real space 10. The area AR1 may be outdoors or indoors. A real person 11 in the area AR1 is able to indirectly experience the distant area AR0 by experiencing the virtual space 20.

Here, the real person 11 (a user) may desire to have a feeling as if he or she is actually moving in the virtual space 20. In other words, the real person 11 may desire to experience the virtual space 20 in conjunction with his or her movement while moving freely, rather than using a device installed at predetermined position. In order to meet such a need, the present embodiment provides a technique capable of coupling the real space 10 with the virtual space 20 in conjunction with the movement of the real person 11 in the real space 10.

Figure 2:
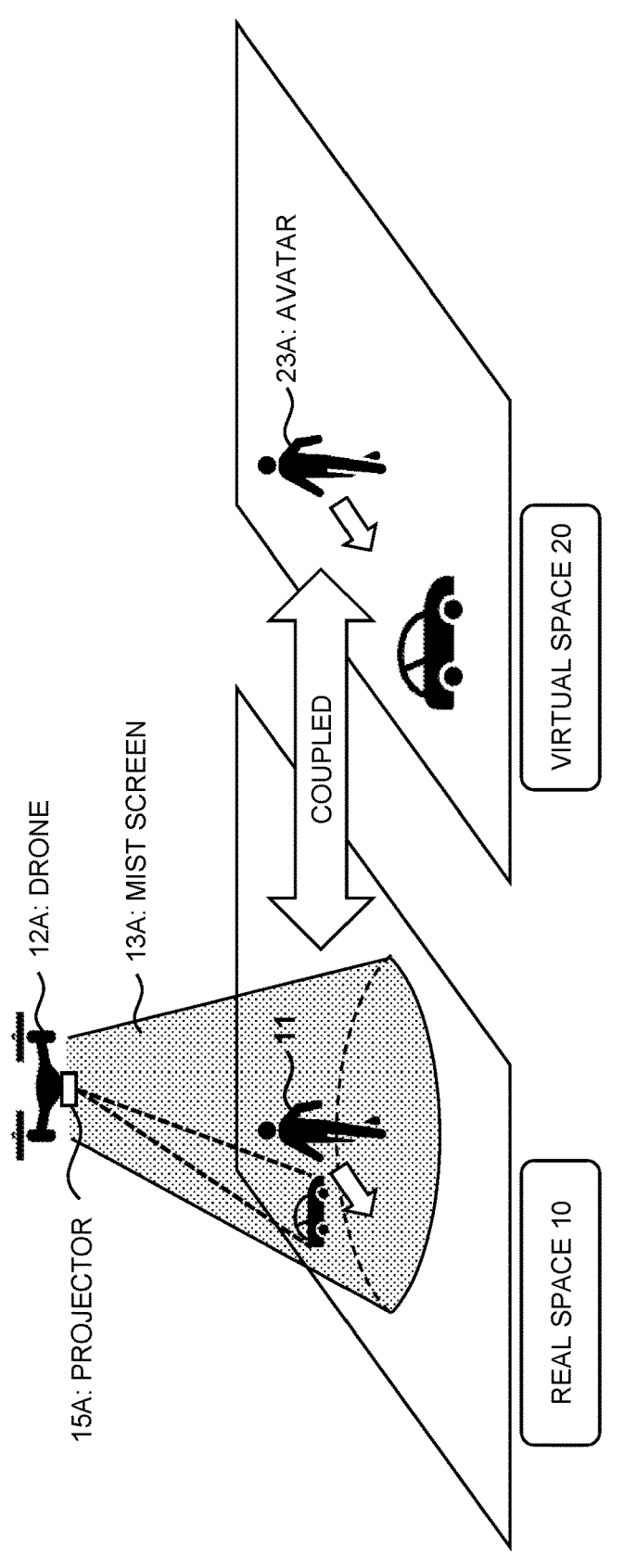
FIG. 2 is a conceptual diagram for explaining an example of coupling (linkage) between the real space and the virtual space.

FIG. 2 is a conceptual diagram for explaining an example of the coupling (linkage) between the real space 10 and the virtual space 20.

In the real space 10, a drone 12A flies near a real person 11 and moves following the real person 11. The drone 12A is equipped with a water tank, and forms a mist screen 13A by spraying mist. The mist screen is a well-known technique and is disclosed, for example, in https://www.seiko-giken.jp/solution/screen. The drone 12A is able to stably form a conical mist screen 13A by utilizing its rotation. In particular, the drone 12A forms the conical mist screen 13A so as to cover around the real person 11. Due to the mist screen 13A, a space dedicated to the real person 11 is formed. When the real person 11 moves, the drone 12A moves following the real person 11, and thus the mist screen 13A also moves following the real person 11.

In the following description, a "real position" means a position in the real space 10, and a "virtual position" means a position in the virtual space 20. The real position in the real space 10 and the virtual position in the virtual space 20 are associated with each other in advance. A "first real position" is the real position of the real person 11. A "first virtual position" is the virtual position associated with the first real position. Therefore, when the first real position changes, the first virtual position also changes in conjunction with the first real position.

An avatar 23A of the real person 11 is set (located) at the first virtual position in the virtual space 20. A facial expression and a pose of the real person 11 may be reflected in the avatar 23A. Since the first real position and the first virtual position are associated with each other, when the real person 11 moves in the real space 10, the avatar 23A of the real person 11 also moves in the virtual space 20 in conjunction with the movement of the real person 11.

A projector 15A is mounted on the drone 12A. The projector 15A is able to project an image (video) from the inside of the mist screen 13A toward the mist screen 13A. The image projected on the mist screen 13A is an image around the avatar 23A in the virtual space 20. Preferably, the image projected on the mist screen 13A is an image of the virtual space 20 as viewed from eyes of the avatar 23A.

When the real person 11 moves in the real space 10, the avatar 23A of the real person 11 also moves in the virtual space 20 in conjunction with the movement of the real person 11. When the avatar 23A moves in the virtual space 20, the image of the virtual space 20 projected on the mist screen 13A around the real person 11 also changes in conjunction with the movement of the avatar 23A. As a result, the real person 11 is able to feel as if he or she is actually moving in the virtual space 20. In other words, the real person 11 is able to experience the virtual space 20 in conjunction with his or her movement while moving freely without using a device installed at a predetermined position.

Figure 3:
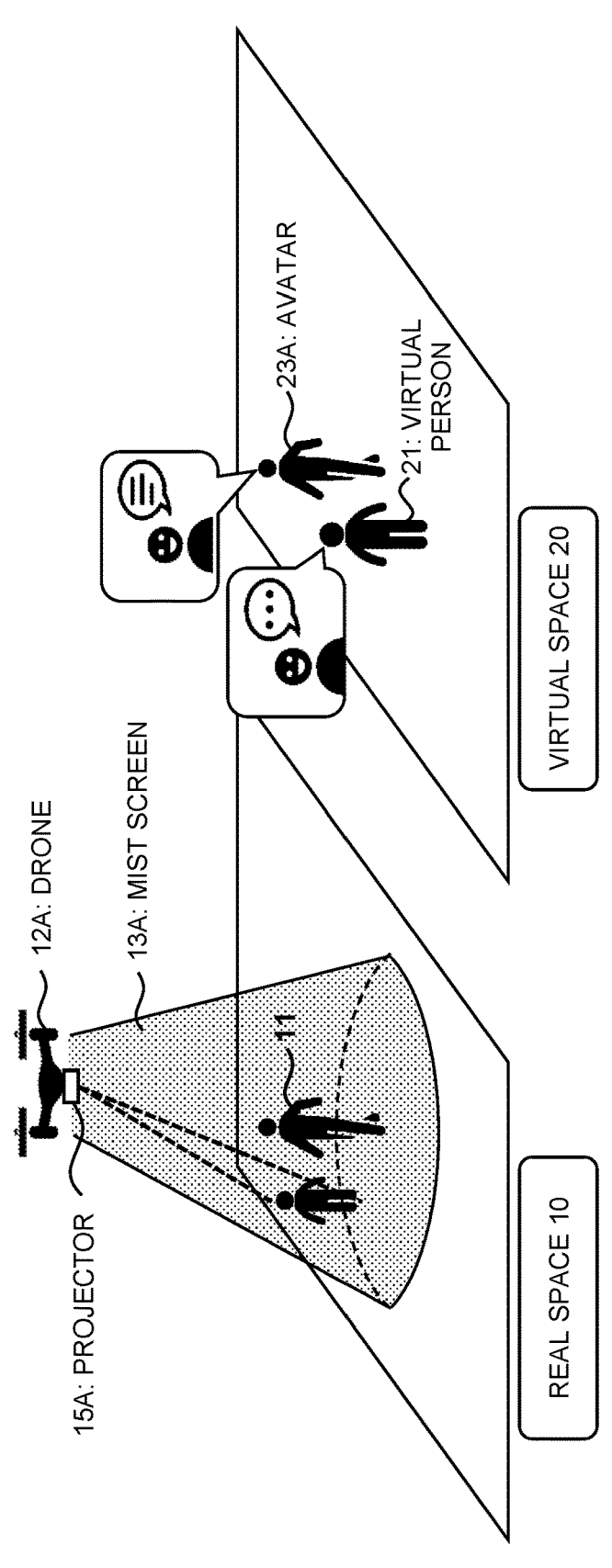
FIG. 3 is a conceptual diagram for explaining an example of coupling (linkage) between the real space and the virtual space.

FIG. 3 is a conceptual diagram for explaining communication between the real person 11 in the real space 10 and a virtual person 21 in the virtual space 20. In the virtual space 20, there are many virtual persons 21 (avatars) in addition to the avatar 23A of the real person 11. The avatar 23A of the real person 11 in the virtual space 20 can be a "starting point" of communication.

For example, the virtual person 21 side gives a trigger for the commutation. More specifically, in the virtual space 20, a virtual person 21 accesses the avatar 23A of the real person 11. In response to the access, information of the virtual person 21 who has accessed the avatar 23A is projected on the mist screen 13A around the real person 11 in the real space 10. Typically, an image of the virtual person 21 is projected on the mist screen 13A. Then, the real person 11 and the virtual person 21 start communication. The communication may be performed by voice or by text.

As another example, the real person 11 side may give a trigger for the communication. More specifically, one or more virtual persons 21 around the avatar 23A in the virtual space 20 are shown in the image projected on the mist screen 13A. The real person 11 designates any one of the virtual persons 21 shown in the image on the mist screen 13A as a communication partner. When designating the communication partner, the real person 11 may touch or point the virtual person 21 projected on the mist screen 13A. The designated virtual person 21 is notified of the designation. Then, the real person 11 and the virtual person 21 start communication. The communication may be performed by voice or by text.

As described above, according to the present embodiment, the real space 10 and the virtual space 20 are coupled (linked) with each other so as to be in conjunction with the movement of the real person 11 in the real space 10. This enables the real person 11 to experience the virtual space 20 in conjunction with his or her movement while moving freely without using a device installed at a predetermined position.

In the example shown in FIGS. 2 and 3, the real person 11 is reproduced by the avatar 23A in the virtual space 20, and the virtual space 20 or the virtual person 21 is reproduced on the mist screen 13A in the real space 10. In this sense, it can be said that the real space 10 and the virtual space 20 partially overlap each other. The portion where the real space 10 and the virtual space 20 overlap serves as a window for the communication between the real person 11 and the virtual person 21. In other words, the real person 11 and the virtual person 21 are able to communicate with each other via the portion where the real space 10 and the virtual space 20 overlap.

It should be noted that the examples shown in FIGS. 2 and 3 are merely examples of the coupling (linkage) between the real space 10 and the virtual space 20. Various examples of the coupling (linkage) between the real space 10 and the virtual space 20 will be described later. In addition, the virtual space 20 may not necessarily represent the area AR0 in the real world. The virtual space 20 may represent a fictional world.

Hereinafter, a "space coupling system 1" for coupling the real space 10 with the virtual space 20 will be described in detail.

2. Space Coupling System

Figure 4:
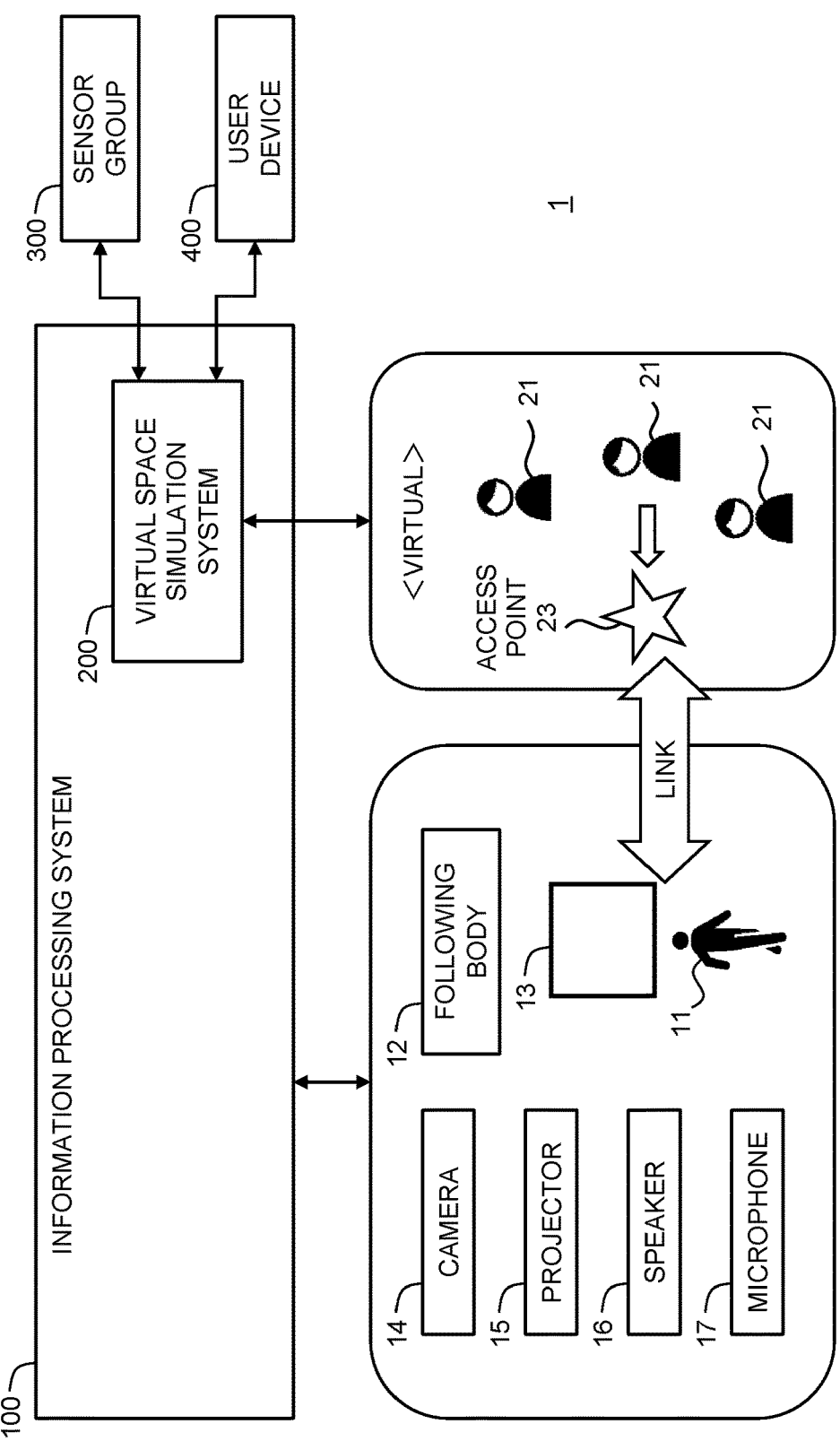
FIG. 4 is a schematic diagram showing a configuration example of a space coupling system.

FIG. 4 is a schematic diagram showing a configuration example of a space coupling system 1 according to the present embodiment. The space coupling system 1 couples (links) the real space 10 with the virtual space 20. The coupling between the real space 10 and the virtual space 20 contributes to promotion of communication, business, and the like.

2-1. Configuration of Surroundings of Real Person

The space coupling system 1 includes a following body 12, a screen 13, a camera 14, a projector 15, a speaker 16, and a microphone 17 in the real space 10. The following body 12 is configured to follow the real person 11. The screen 13 is provided so as to follow the following body 12. As a result, the screen 13 moves following the real person 11. The camera 14 captures an image of the real person 11 and the surroundings thereof. The projector 15 is installed so as to be able to project a variety of images onto the screen 13. The speaker 16 outputs a variety of sounds towards the real person 11. The microphone 17 detects voice of the real person 11.

Various concrete examples of a configuration around the real person 11 will be described below.

2-1-1. First Example

Figure 5:
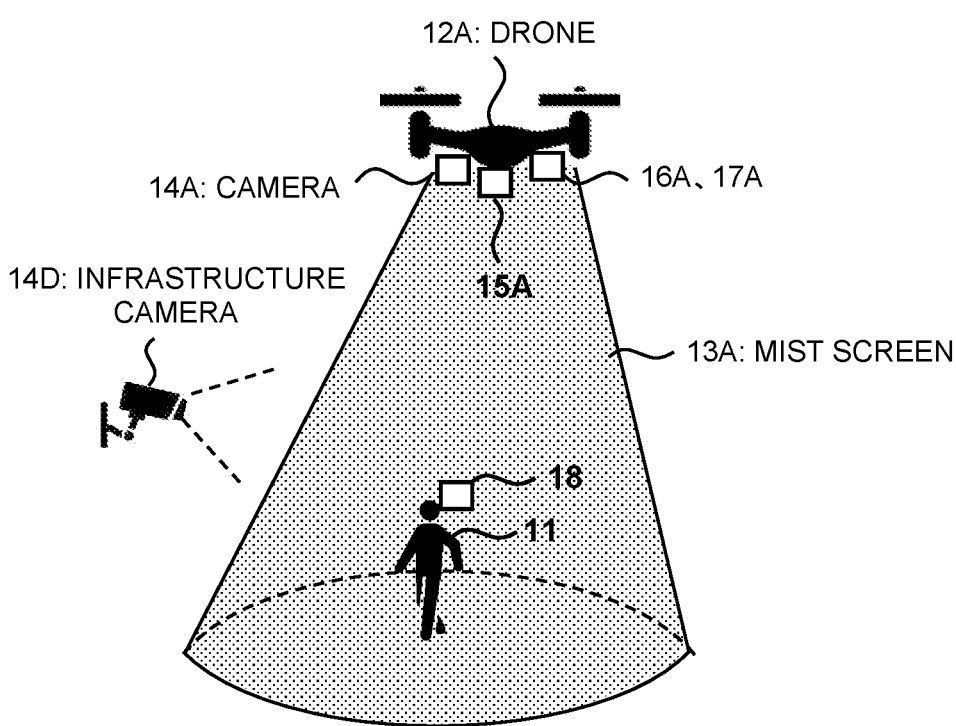
FIG. 5 is a schematic diagram showing a first example of a configuration around a real person in the real space.

FIG. 5 is a schematic diagram showing a first example of the configuration around the real person 11. The following body 12 is a drone 12A. The screen 13 is a mist screen 13A. The camera 14 includes a camera 14A that is mounted on the drone 12A and captures an image of a situation around the drone 12A. The camera 14 may include an infrastructure camera 14D. The projector 15 is a projector 15A mounted on the drone 12A. The speaker 16 includes a directional speaker 16A mounted on the drone 12A. The microphone 17 includes a directional microphone 17A mounted on the drone 12A. The real person 11 may wear a headset 18 including the speaker 16 and the microphone 17.

The drone 12A has a self-position estimation (localization) function. The drone 12A may estimate its position by utilizing a global navigation satellite system (GNSS). The drone 12A may be configured to be capable of autonomous flight.

The drone 12A moves following the real person 11. For example, the drone 12A acquires an image captured by the camera 14A. A target image which is an image of the real person 11 to be followed is registered in advance. Based on the target image, the drone 12A recognizes the real person 11 shown in the image captured by the camera 14A. A machine learning model is used for the person recognition. The drone 12A is able to follow the real person 11 by tracking the real person 11 recognized in the image.

As another example, the drone 12A may acquire information of an absolute position of the real person 11. The information of the absolute position of the real person 11 may be provided from an external device outside the drone 12A. The drone 12A is able to follow the real person 11 based on the self-position obtained by the self-position estimation function and the absolute position of the real person 11.

The mist screen 13A is formed by mist sprayed from the drone 12A (see FIGS. 2 and 3). Therefore, the mist screen 13A moves following the drone 12A. The drone 12A is able to stably form a conical mist screen 13A by using its rotation. In particular, the drone 12A forms the conical mist screen 13A so as to cover around the real person 11. Due to such the mist screen 13A, a space dedicated to the real person 11 is formed.

The projector 15A projects an image (video) from the inside of the mist screen 13A toward the mist screen 13A.

The directional speaker 16A is realized by, for example, an audio spot for minimum area technology using ultrasonic waves (http://www.activeforall.jp/project/project02/)).

2-1-2. Second Example

Figure 6:
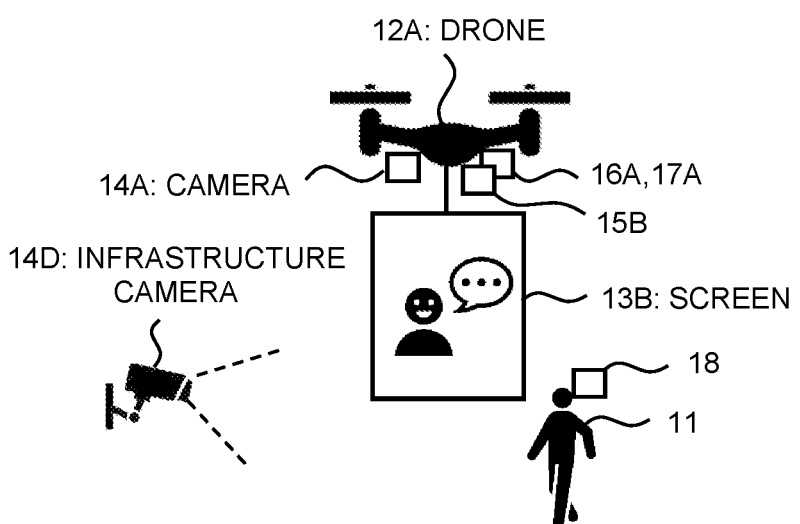
FIG. 6 is a schematic diagram showing a second example of a configuration around a real person in the real space.

FIG. 6 is a schematic diagram showing a second example of the configuration around the real person 11. The components other than the screen 13 and the projector 15 are the same as those in the first example described above. A description overlapping with the first example described above will be omitted as appropriate.

In the second example, the screen 13 is a screen 13B hanging from the drone 12A. Since the screen 13B hangs from the drone 12A, the screen 13B moves following the drone 12A.

For example, the screen 13B is a cloth screen hanging from the drone 12A. In this case, the projector 15A mounted on the drone 12A projects an image (video) on the screen 13B.

As another example, the screen 13B may be a screen of a display device. Examples of the display device include a liquid-crystal display, an organic electroluminescent display, and the like. The display device may be a touch panel. The display device displays an image (video) on the screen 13B. In this case, the projector 15A is not necessary.

2-1-3. Third Example

Figure 7:
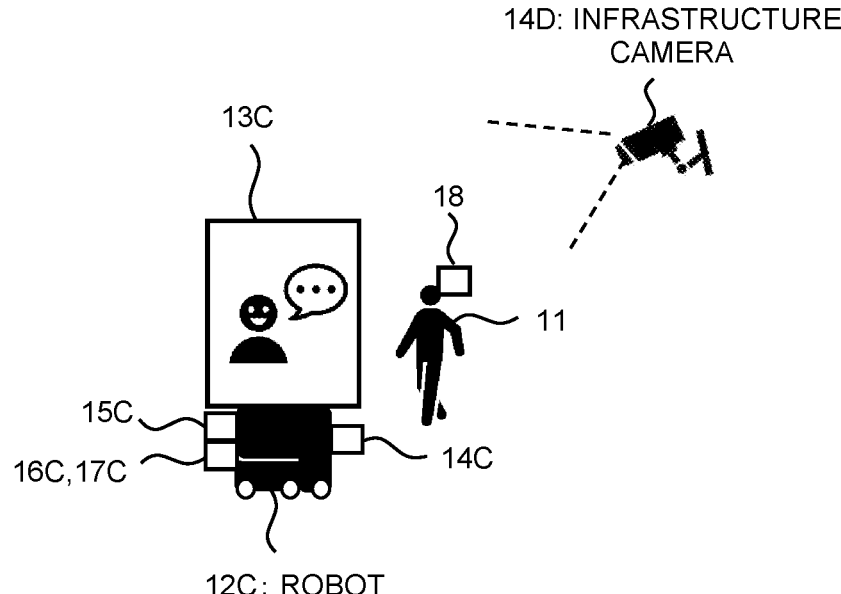
FIG. 7 is a schematic diagram showing a third example of a configuration around a real person in the real space.

FIG. 7 is a schematic diagram showing a third example of the configuration around the real person 11. The following body 12 is a robot 12C. The screen 13 is a screen 13C installed on the robot 12C. The camera 14 includes a camera 14C mounted on the robot 12C and configured to capture an image of a situation around the robot 12C. The camera 14 may include an infrastructure camera 14D. The projector 15 is a projector 15C mounted on the robot 12C. The speaker 16 includes a directional speaker 16C mounted on the robot 12C. The microphone 17 includes a directional microphone 17C mounted on the robot 12C. The real person 11 may wear a headset 18 including the speaker 16 and the microphone 17.

The robot 12C has a self-position estimation (localization) function. The robot 12C may estimate its position by utilizing the GNSS. The robot 12C may be configured to be capable of autonomous traveling.

The robot 12C moves following the real person 11. For example, the robot 12C acquires an image captured by the camera 14C. A target image which is an image of the real person 11 to be followed is registered in advance. Based on the target image, the robot 12C recognizes the real person 11 shown in the image captured by the camera 14C. A machine learning model is used for the person recognition. The robot 12C is able to follow the real person 11 by tracking the real person 11 recognized in the image.

As another example, the robot 12C may acquire information of an absolute position of the real person 11. The information of the absolute position of the real person 11 may be provided from an external device outside the robot 12C. The robot 12C is able to follow the real person 11 based on the self-position obtained by the self-position estimation function and the absolute position of the real person 11.

The screen 13C is installed on the robot 12C, and thus moves following the robot 12C. For example, the screen 13C is a screen of a display device. Examples of the display device include a liquid-crystal display, an organic electroluminescent display, and the like. The display device may be a touch panel. The display device displays an image (video) on the screen 13C (screen).

As another example, the screen 13C is a screen standing on the top of the robot 12C. In this case, the projector 15C mounted on the robot 12C projects an image (video) onto the screen 13C.

2-1-4. Fourth Example

In a fourth example, the following body 12 is a terminal (e.g., a smartphone) carried by the real person 11. The terminal carried by the real person 11 automatically moves following the real person 11. The screen 13 is a screen of a display device of the terminal. The camera 14, the speaker 16, and the microphone 17 are mounted on the terminal. The terminal acquires the self-position information by utilizing the GNSS or the like.

2-2. Information Processing System

As shown in FIG. 4, the space coupling system 1 further includes an information processing system 100 that executes a variety of information processing.

2-2-1. Overview

The information processing system 100 directly or indirectly communicates with the following body 12, the screen 13, the camera 14, the projector 15, the speaker 16, and the microphone 17 in the real space 10. Further, the information processing system 100 directly or indirectly controls the following body 12, the screen 13, the camera 14, the projector 15, the speaker 16, and the microphone 17 in the real space 10.

For example, the information processing system 100 controls the following body 12. The information processing system 100 may include a control device (controller) mounted on the following body 12. That is, at least a part of the information processing system 100 may be included in the following body 12. When the screen 13 is installed on the following body 12, the information processing system 100 may indirectly control the screen 13 by controlling the following body 12. When the camera 14 is mounted on the following body 12, the information processing system 100 may indirectly control the camera 14 by controlling the following body 12, and may acquire the image acquired by the camera 14 via the following body 12. When the projector 15 is mounted on the following body 12, the information processing system 100 may indirectly control the projector 15 by controlling the following body 12. When the speaker 16 is mounted on the following body 12, the information processing system 100 may indirectly control the speaker 16 by controlling the following body 12. When the microphone 17 is mounted on the following body 12, the information processing system 100 may indirectly control the microphone 17 by controlling the following body 12, and may acquire the voice information detected by the microphone 17 via the following body 12.

In addition, the information processing system 100 includes a virtual space simulation system 200. The virtual space simulation system 200 simulates the virtual space 20.

The virtual space 20 is configured to reproduce, for example, the area AR0 in the real space 10 (see FIG. 1). For example, the area AR0 is a town, a building, or the like. In the area AR0, a sensor group 300 for detecting a situation of the area AR0 is provided. The situation of the area AR0 includes a situation of people and moving bodies present in the area AR0. The virtual space simulation system 200 communicates with the sensor group 300 and acquires information on the situation of the area AR0 detected by the sensor group 300. Then, the virtual space simulation system 200 reproduces the area AR0 in the virtual space 20 by utilizing the DigitalTwin technique.

It should be noted that the virtual space 20 may not necessarily represent the area AR0 in the real world. The virtual space 20 may represent a fictional world.

A user device 400 is used by another user different from the real person 11 in order to participate in the virtual space 20. Examples of the user device 400 include a user terminal such as a PC, a smartphone, and the like. The user device 400 may be a wearable device. The user device 400 is provided with an input device and an output device. Examples of the input device include a keyboard, a touch panel, a mouse, a microphone, and the like. Examples of the output device include a display device, a speaker, and the like. The user operates the input device of the user device 400 to set a virtual person 21 representing himself or herself in the virtual space 20. The virtual person 21 may be an avatar of the user. Moreover, the user operates the input device of the user device 400 to move the virtual person 21 in the virtual space 20. The microphone detects a voice of the user. The display device presents a variety of information to the user. The speaker outputs a variety of sounds to the user.

The virtual space simulation system 200 communicates with user device 400. The virtual space simulation system 200 reflects the information input by the user to the input device of the user device 400 in the virtual space 20. Moreover, the virtual space simulation system 200 outputs a variety of information on the virtual space 20 from the output device of the user device 400.

2-2-2. Configuration Example

Figure 8:
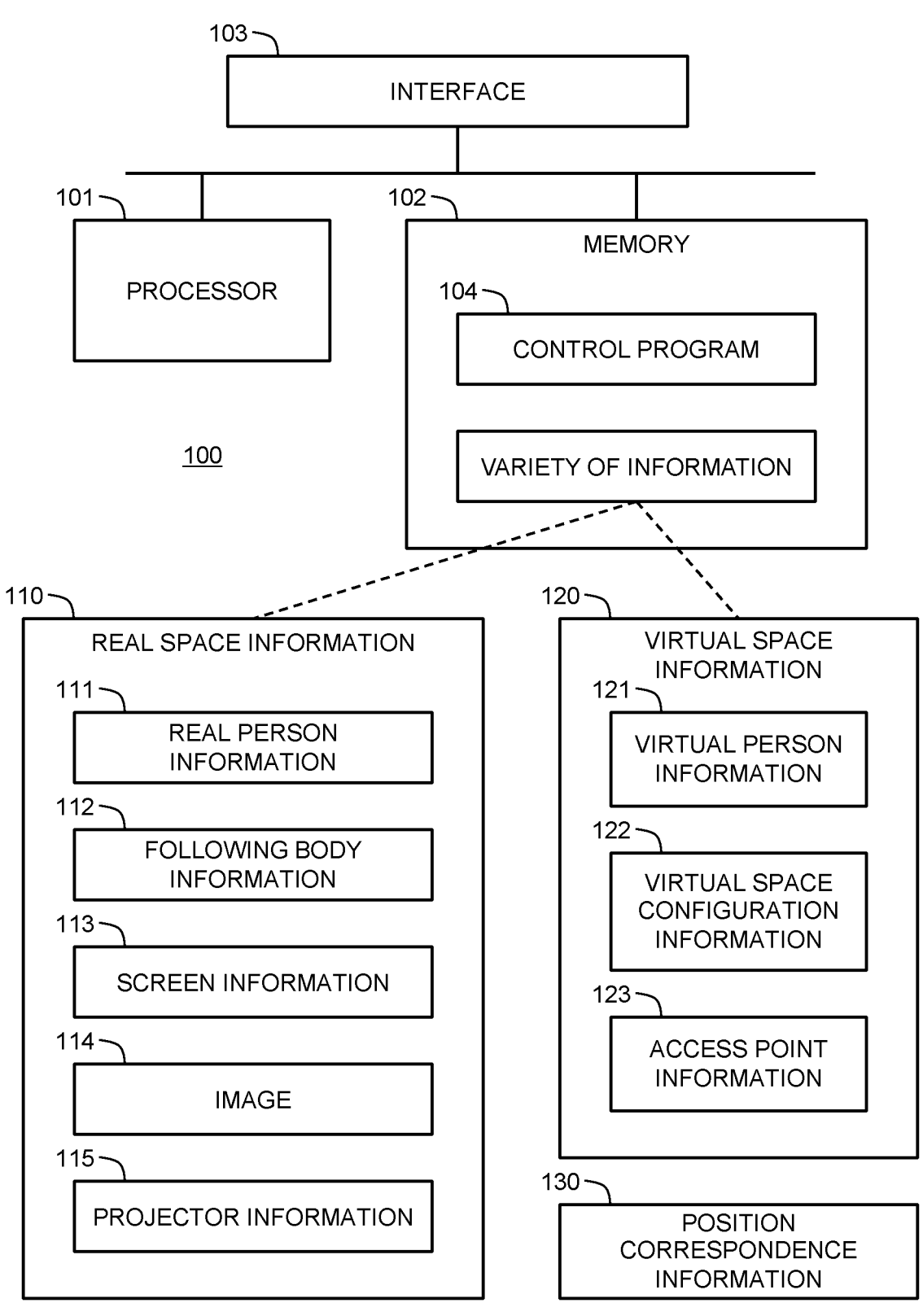
FIG. 8 is a block diagram showing a configuration example of an information processing system included in the space coupling system.

FIG. 8 is a block diagram showing a configuration example of the information processing system 100. The information processing system 100 includes one or more processors 101 (hereinafter, simply referred to as a processor 101 or processing circuitry), one or more memories 102 (hereinafter, simply referred to as a memory 102), and an interface 103. The processor 101 executes a variety of processing. For example, the processor 101 includes a central processing unit (CPU). The memory 102 stores a variety of information. Examples of the memory 102 include a volatile memory, a non-volatile memory, a hard disk drive (HDD), a solid state drive (SSD), and the like. The interface 103 is an interface for communicating with various components (the following body 12, the screen 13, the camera 14, the projector 15, the speaker 16, the microphone 17, the sensor group 300, the user device 400, and the like). The processor 101 can communicate with the various components via the interface 103.

A control program 104 is a computer program executed by the processor 101. The functions of the information processing system 100 may be implemented by a cooperation of the processor 101 executing the control program 104 and the memory 102. The control program 104 is stored in the memory 102. Alternatively, the control program 104 may be recorded on a non-transitory computer-readable recording medium. The control program 104 may be provided via a network.

The memory 102 stores real space information 110 regarding the real space 10, virtual space information 120 regarding the virtual space 20, and position correspondence information 130. The position correspondence information 130 indicates a predetermined correspondence relationship between the real position in the real space 10 and the virtual position in the virtual space 20.

The real space information 110 includes real person information 111, following body information 112, screen information 113, an image 114, and projector information 115. The image 114 is captured by the camera 14. The camera 14 includes the camera 14 (14A, 14C: see FIGS. 5 to 7) mounted on the following body 12 and the infrastructure camera 14D.

The real person information 111 is information on the real person 11. For example, the real person information 111 includes registration information of the real person 11. For example, the registration information includes identification information of the real person 11, a target image which is an image of the real person 11, information of the avatar 23A of the real person 11, and the like. The real person 11 may register the registration information in the information processing system 100 in advance by operating a terminal (not shown).

In addition, the real person information 111 includes state information indicating a position (absolute position), a direction of movement, a pose, and the like of the real person 11. For example, the camera 14 mounted on the following body 12 captures an image 114 of an area including the real person 11. The following body 12 estimates its position by the self-position estimation function. The processor 101 acquires the image 114 captured by the camera 14 and the position information of the following body 12. The processor 101 recognizes the real person 11 shown in the image 114, based on the target image registered in advance. A machine learning model is used for the person recognition. The processor 101 calculates the position (absolute position) of the real person 11 by combining the position (absolute position) of the following body 12 and the result of recognition of the real person 11. The processor 101 calculates the direction of movement of the real person 11 based on a history of the position of the real person 11. Further, the processor 101 recognizes the pose (posture) of the real person 11 based on the result of recognition of the real person 11 in the image 114.

As another example, an image 114 of an area including the real person 11 is captured by the infrastructure camera 14D. The infrastructure camera 14D provides installation information indicating its installation position and installation orientation. The processor 101 acquires the image 114 captured by the infrastructure camera 14D and the installation information of the infrastructure camera 14D. The processor 101 recognizes the real person 11 shown in the image 114, based on the target image registered in advance. A machine learning model is used for the person recognition. The processor 101 calculates the position (absolute position) of the real person 11 by combining the installation information of the infrastructure camera 14D and the result of recognition of the real person 11. The processor 101 calculates the direction of movement of the real person 11 based on a history of the position of the real person 11. Further, the processor 101 recognizes the pose (posture) of the real person 11 based on the result of recognition of the real person 11 in the image 114.

As still another example, since the following body 12 moves following the real person 11, a position and a direction of movement of the following body 12 may be approximately used as the position and the direction of movement of the real person 11. In particular, when the following body 12 is the terminal carried by the real person 11, the position and the direction of movement of the terminal are used as the position and the direction of movement of the real person 11.

The following body information 112 is information on the following body 12. The following body information 112 includes identification information of the following body 12. In addition, the following body information 112 includes the identification information of the real person 11 assigned to the following body 12, that is, the real person 11 to be followed by the following body 12. In other words, the following body information 112 includes information on an assignment relationship between the real person 11 and the following body 12. The assignment relationship between the real person 11 and the following body 12 is determined in advance by the processor 101. Further, the following body information 112 includes position information of the following body 12. As described above, the position information of the following body 12 is obtained by the self-position estimation function of the following body 12. The processor 101 acquires the position information from the following body 12.

The following body information 112 may further include control information for controlling the following body 12. The processor 101 acquires the position (absolute position) and the direction of movement of the real person 11 from the real person information 111. The processor 101 calculates a control amount necessary for the following body 12 to follow the real person 11 based on the position of the following body 12 and the position and the direction of movement of the real person 11. Then, the processor 101 provides the control information including the calculated control amount to the following body 12, thereby controlling the following body 12.

The screen information 113 is information on the screen 13. The screen information 113 indicates a position, a size, a shape, and the like of the screen 13. The position of the screen 13 may be an absolute position of the screen 13 or a relative position of the screen 13 with respect to the following body 12. When the screen 13 is the mist screen 13A (see FIG. 5), the relative position, the size, and the shape of the mist screen 13A can be estimated based on an ejection direction and an ejection pressure of the mist. When the screen 13 is the screen 13B (see FIG. 6) or the screen 13C (see FIG. 7), the relative position, the size, and the shape of the screen 13 are predetermined. The absolute position of the screen 13 is obtained by combining the absolute position of the following body 12 and the relative position of the screen 13. When the screen 13 is a screen of the terminal carried by the real person 11, the terminal position is used as the position of the screen 13.

The projector information 115 is information on the projector 15. The projector information 115 indicates an installation position and an installation orientation of the projector 15 in the following body 12.

The virtual space information 120, which is information on the virtual space 20, is used by the virtual space simulation system 200 in particular. The virtual space information 120 includes virtual person information 121, virtual space configuration information 122, and access point information 123.

The virtual person information 121 is information regarding the virtual person 21. For example, the virtual person information 121 includes registration information of a user who participates in the virtual space 20 via the virtual person 21. For example, the registration information includes identification information of the user, an image of the user, an image of the virtual person 21 (avatar), and the like. The user may register the registration information in the information processing system 100 in advance by operating the user device 400.

In addition, the virtual person information 121 includes position information of the virtual person 21 in the virtual space 20. The user operates the input device of the user device 400 to move the virtual person 21 in the virtual space 20. The processor 101 calculates the position of the virtual person 21 in the virtual space 20 based on contents of the operation of the input device by the user.

The virtual space configuration information 122 indicates a configuration of the virtual space 20. For example, the virtual space configuration information 122 indicates a three dimensional arrangement of structures (e.g., roads, road structures, buildings, etc.) in the virtual space 20. In addition, the virtual space configuration information 122 indicates positions of moving bodies (e.g., vehicles, robots, etc.) in the virtual space 20.

The access point information 123 is information on an "access point 23" set in the virtual space 20. The access point 23 will be described in more detail below.

2-3. Access Point

The processor 101 sets the access point 23 accessible by the virtual person 21 in the virtual space 20.

More specifically, the processor 101 locates the access point 23 at the first virtual position in the virtual space 20. The first virtual position is the virtual position associated with the first real position in the real space 10. The first real position is the real position of the real person 11 or the real position of the screen 13 that moves following the real person 11. The real position of the real person 11 is obtained from the real person information 111. The real position of the screen 13 is obtained from the screen information 113. The correspondence relationship between the real position in the real space 10 and the virtual position in the virtual space 20 is given by the position correspondence information 130. Therefore, the processor 101 is able to convert the first real position into the first virtual position based on the position correspondence information 130. Then, the processor 101 locates (sets) the access point 23 at the first virtual position.

When the real person 11 moves and the first real position changes, the first virtual position also changes in conjunction with the change in the first real position. That is, when the real person 11 moves in the real space 10, the access point 23 also moves in the virtual space 20 in conjunction with the movement of the real person 11.

The access point 23 indicates information of the real person 11 or an image of the real space 10 around the first real position. Some examples of the access point 23 will be described below.

2-3-1. First Example of Access Point

Figure 9:
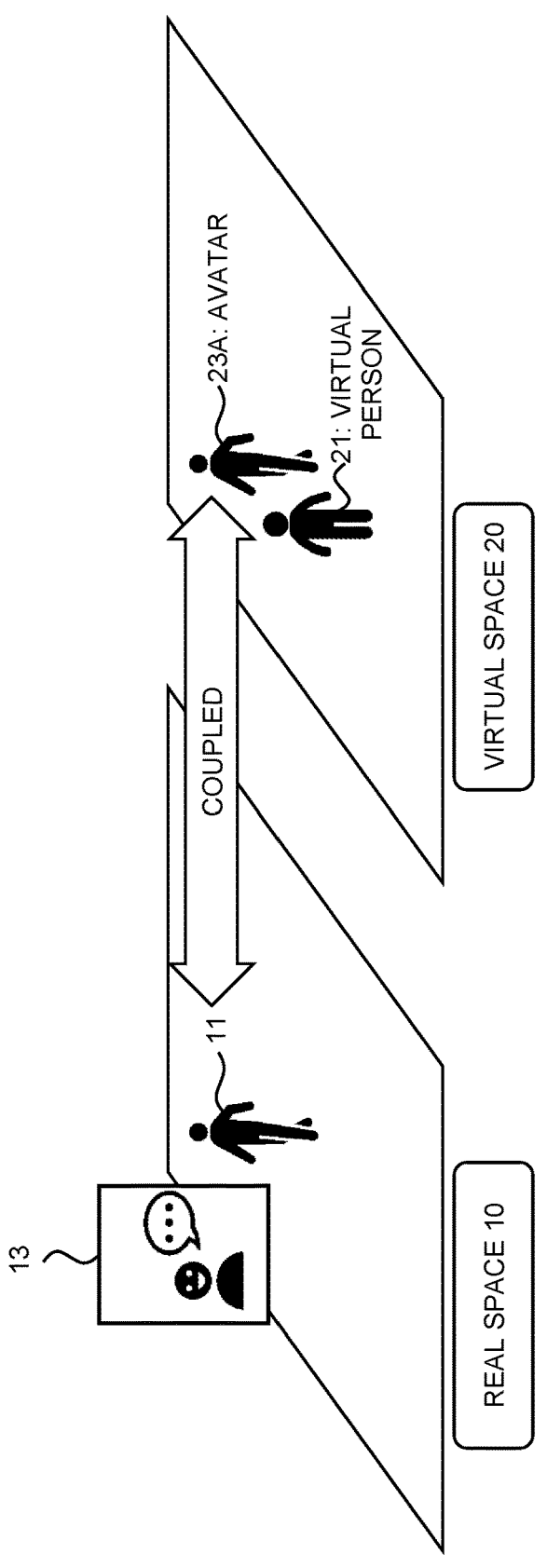
FIG. 9 is a conceptual diagram for explaining a first example of an access point set in the virtual space.

FIG. 9 is a conceptual diagram for explaining a first example of the access point 23. In the first example, the access point 23 is the avatar 23A of the real person 11. The avatar 23A of the real person 11 corresponds to the information of the real person 11 described above. The first real position is the real position of the real person 11 in the real space 10. The first virtual position is the virtual position associated with the real position of the real person 11.

The processor 101 acquires information of the avatar 23A of the real person 11 from the real person information 111. The processor 101 locates the avatar 23A of the real person 11 at the first virtual position in the virtual space 20. When the real person 11 moves in the real space 10, the avatar 23A of the real person 11 also moves in the virtual space 20 in conjunction with the movement of the real person 11. The processor 101 may apply the pose (posture) of the real person 11 to the avatar 23A. The pose of the real person 11 is obtained from the real person information 111.

The processor 101 displays or projects a variety of information on the screen 13 in the real space 10. For example, the processor 101 projects a variety of information on the screen 13 by controlling the projector 15. When the screen 13 is a screen of a display device, the processor 101 displays a variety of information on the screen 13 by controlling the display device.

For example, the processor 101 displays or projects an image of the virtual space 20 around the avatar 23A on the screen 13. Preferably, the processor 101 displays or projects an image of the virtual space 20 as viewed from eyes of the avatar 23A on the screen 13. The processor 101 draws the image of the virtual space 20 viewed from the eyes of the avatar 23A, based on the position of the avatar 23A (i.e., the first virtual position) and the virtual space configuration information 122.

In the virtual space 20, there are many virtual persons 21 (avatars) in addition to the avatar 23A of the real person 11. The avatar 23A of the real person 11 in the virtual space 20 can be a "starting point" of communication.

For example, the virtual person 21 operated by the user gives a trigger for the commutation. More specifically, the user operates the input device of the user device 400 to make the virtual person 21 access the avatar 23A. For example, when the user clicks on the avatar 23A, the virtual person 21 accesses the avatar 23A.

In response to the access to the avatar 23A by the virtual person 21, the processor 101 displays or projects the information regarding the virtual person 21 on the screen 13 in the real space 10. For example, the processor 101 displays or projects an image of the virtual person 21 or an image of the user operating the virtual person 21 on the screen 13. Such the information regarding the virtual person 21 is obtained from the virtual person information 121.

Then, the real person 11 and the virtual person 21 start communication. The communication may be performed by voice or by text. For example, the processor 101 acquires the voice of the real person 11 from the microphone 17 and outputs the voice of the real person 11 from the speaker of the user device 400. Moreover, the processor 101 acquires the user's voice from the microphone of the user device 400 and outputs the user's voice from the speaker 16.

In this manner, locating (setting) the avatar 23A of the real person 11 in the virtual space 20 can promote the communication.

As another example, the real person 11 may give a trigger for the communication. As described above, the image of the virtual space 20 around the avatar 23A is displayed or projected on the screen 13. One or more virtual persons 21 around the avatar 23A are shown in the image. The real person 11 designates one of the virtual persons 21 shown in the image on the screen 13 as a communication partner. When designating the communication partner, the real person 11 may touch the virtual person 21 on the screen 13 or may point at the virtual person 21 on the screen 13. Such a designating action of the real person 11 is detected based on the image 114 captured by the camera 14. Alternatively, when the screen 13 is a touch panel, the designating action of the real person 11 is detected by the touch panel. The processor 101 displays or projects information of the virtual person 21 designated by the real person 11 on the screen 13 in the real space 10. For example, the processor 101 displays or projects an image of the designated virtual person 21 or an image of the user operating the designated virtual person 21 on the screen 13. Such the information regarding the virtual person 21 is obtained from the virtual person information 121. Then, the real person 11 and the virtual person 21 start the communication.

2-3-2. Second Example of Access Point

Figure 10:
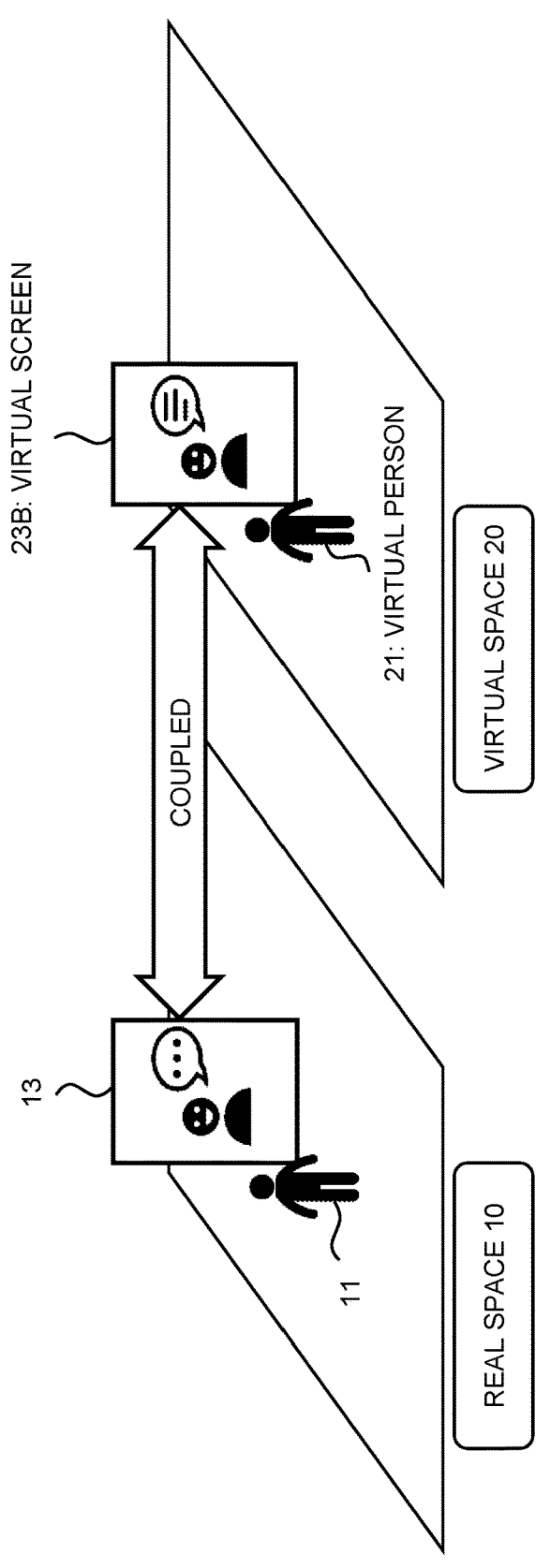
FIG. 10 is a conceptual diagram for explaining a second example of an access point set in the virtual space.

FIG. 10 is a conceptual diagram for explaining a second example of the access point 23. A description overlapping with the first example described above will be omitted as appropriate.

In the second example, the access point 23 is a virtual screen 23B. The first real position may be the real position of the real person 11 or the real position of the screen 13. A size and a shape of the virtual screen 23B may be set to be the same as the size and the shape of the screen 13 in the real space 10, respectively. The size and the shape of the screen 13 are obtained from the screen information 113. The processor 101 locates (sets) the virtual screen 23B at the first virtual position in the virtual space 20. When the real person 11 moves in the real space 10, the virtual screen 23B also moves in the virtual space 20 in conjunction with the movement of the real person 11.

The processor 101 displays or projects the image of the real space 10 around the first real position on the virtual screen 23B in the virtual space 20. The image of the real space 10 around the first real position is obtained from the image 114 captured by the camera 14.

On the other hand, the processor 101 displays or projects the image of the virtual space 20 around the virtual screen 23B on the screen 13 in the real space 10. The processor 101 draws the image of the virtual space 20 around the virtual screen 23B based on the position of the virtual screen 23B (i.e., the first virtual position) and the virtual space configuration information 122.

As a result, the screen 13 in the real space 10 and the virtual screen 23B in the virtual space 20 overlap with each other to become like a "transparent window". The real person 11 in the real space 10 can see what's going on in the virtual space 20 through the screen 13. The virtual person 21 in the virtual space 20 can see what's going on in the real space 10 through the virtual screen 23B. This also contributes to promotion of the communication.

The method of communication between the real person 11 and the virtual person 21 is the same as that in the first example described in the above Section 2-3-1.

2-4. Processing Flow

Figure 11:
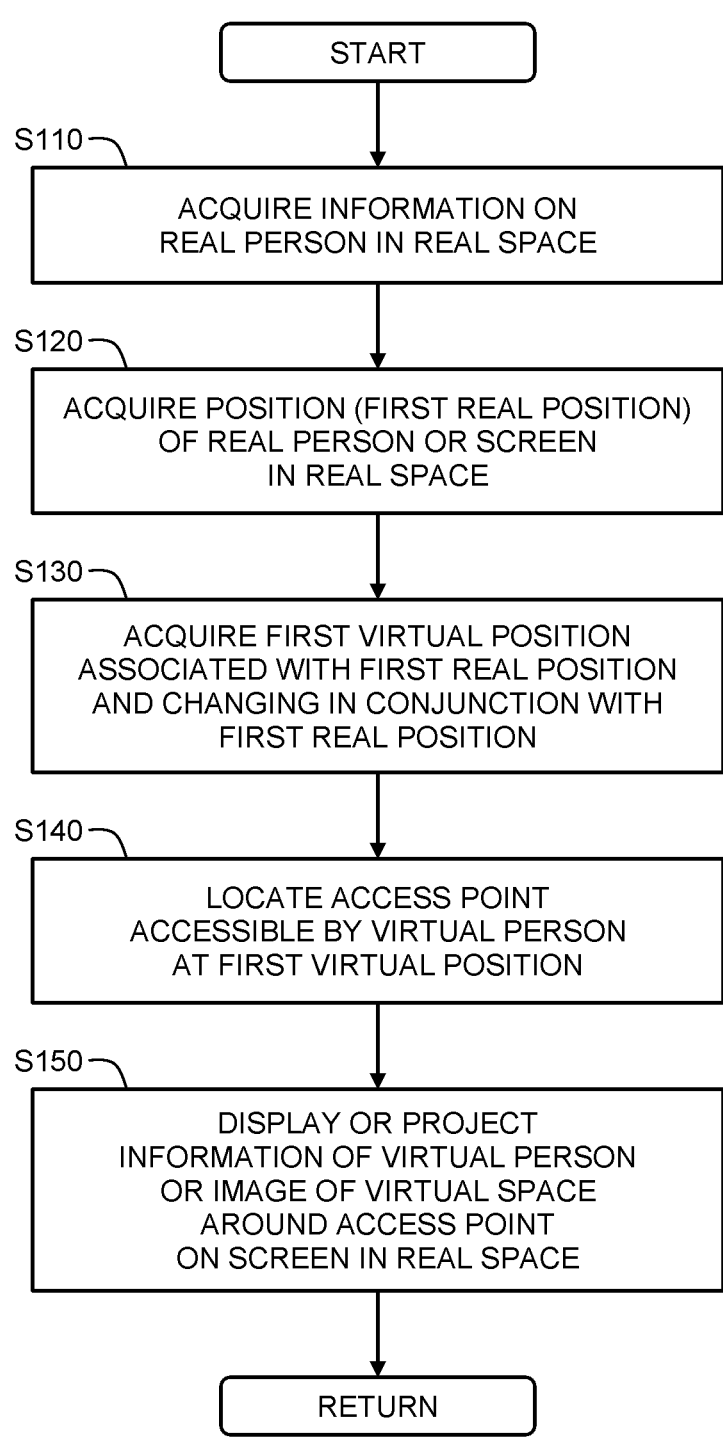
FIG. 11 is a flowchart showing an example of processing by the information processing system.

FIG. 11 is a flowchart showing an example of processing performed by the information processing system 100 (the processor 101).

In Step S110, the information processing system 100 acquires the real person information 111 regarding the real person 11 in the real space 10.

In Step S120, the information processing system 100 acquires the first real position in the real space 10. The first real position is the real position of the real person 11 or the real position of the screen 13 that moves following the real person 11. The real position of the real person 11 is obtained from the real person information 111. The real position of the screen 13 is obtained from the screen information 113.

In Step S130, the information processing system 100 acquires the first virtual position associated with the first real position. The correspondence relationship between the real position in the real space 10 and the virtual position in the virtual space 20 is given by the position correspondence information 130. Therefore, the information processing system 100 converts the first real position into the first virtual position based on the position correspondence information 130. When the first real position changes, the first virtual position also changes in conjunction with the first real position.

In Step S140, the information processing system 100 locates the access point 23, which is accessible by the virtual person 21 in the virtual space 20, at the first virtual position. The access point 23 indicates the information of the real person 11 or the image of the real space 10 around the first real position.

For example, the access point 23 is the avatar 23A of the real person 11 (see FIG. 9). The avatar 23A of the real person 11 is obtained from the real person information 111. The pose of the real person 11 may be applied to the avatar 23A. The pose of the real person 11 is obtained from the real person information 111.

As another example, the access point 23 may be the virtual screen 23B (see FIG. 10). The information processing system 100 displays or projects the image of the real space 10 around the first real position on the virtual screen 23B. The image of the real space 10 around the first real position is obtained from the image 114 captured by the camera 14.

In Step S150, the information processing system 100 displays or projects a variety of information on the screen 13 in the real space 10. For example, the information processing system 100 projects a variety of information on the screen 13 by controlling the projector 15. When the screen 13 is a screen of a display device, the information processing system 100 displays a variety of information on the screen 13 by controlling the display device.

The information displayed or projected on the screen 13 is, for example, information regarding the virtual person 21 being the communication partner. Examples of the information regarding the virtual person 21 include an image (avatar) of the virtual person 21, an image of the user, and the like. Such the information regarding the virtual person 21 is obtained from the virtual person information 121.

As another example, the information displayed or projected on the screen 13 may be an image of the virtual space 20 around the access point 23. The image of the virtual space 20 around the access point 23 is an image of the virtual space 20 viewed from the first virtual position (i.e., the position of the access point 23). The processor 101 draws the image of the virtual space 20 viewed from the first virtual position, based on the first virtual position and the virtual space configuration information 122.

The processor 101 may determine a size of the image to be displayed or projected on the screen 13 in consideration of a distance between the real person 11 and the screen 13 so as to achieve an appropriate sense of distance when viewed from the real person 11. The position of the real person 11 is obtained from the real person information 111.

The position of the screen 13 is obtained from the screen information 113. Based on the position of the real person 11 and the position of the screen 13, the processor 101 can calculate the distance between the real person 11 and the screen 13 and determine an appropriate image size.

3. Effects

According to the present embodiment, the real position in the real space 10 and the virtual position in the virtual space 20 are associated with each other. In addition, the screen 13 that moves following the real person 11 is provided in the real space 10. On the other hand, the access point 23 accessible by the virtual person 21 is located at the first virtual position associated with the real position of the real person 11 or the screen 13. The information of the virtual person 21 or the image of the virtual space 20 around the access point 23 is displayed or projected on the screen 13 in the real space 10. When the real person 11 moves in the real space 10, the access point 23 also moves in the virtual space 20 in conjunction with the movement of the real person 11. Since the access point 23 moves in the virtual space 20, the information displayed or projected on the screen 13 in the real space 10 also changes in conjunction with the movement.

In this manner, the real space 10 and the virtual space 20 are coupled (linked) with each other so as to be in conjunction with the movement of the real person 11 in the real space 10. As a result, the real person 11 is able to feel as if he or she is actually moving in the virtual space 20. That is, the real person 11 is able to experience the virtual space 20 in conjunction with his or her movement while moving freely without using a device installed at a predetermined position.

According to the present embodiment, the real space 10 or the real person 11 is reproduced at the access point 23 in the virtual space 20, and the virtual space 20 or the virtual person 21 is reproduced on the screen 13 in the real space 10. In this sense, it can be said that the real space 10 and the virtual space 20 partially overlap each other.

The portion where the real space 10 and the virtual space 20 overlap serves as a window for the communication between the real person 11 and the virtual person 21. In other words, the real person 11 and the virtual person 21 are able to communicate with each other via the portion where the real space 10 and the virtual space 20 overlap.

What is claimed is:

1. A space coupling system for coupling real space with virtual space, the space coupling system comprising processing circuitry, wherein a real position in the real space and a virtual position in the virtual space are associated with each other, and the processing circuitry is configured to:

acquire a first real position that is the real position of a real person in the real space or the real position of a screen configured to move following the real person;

acquire a first virtual position that is the virtual position associated with the first real position and changing in conjunction with the first real position;

locate an access point, which is accessible by a virtual person in the virtual space, at the first virtual position in the virtual space;

display or project information regarding the virtual person or an image of the virtual space around the access point on the screen in the real space; and control a following body that moves following the real person in the real space, the screen being provided to follow the following body, and the following body being a drone.

2. The space coupling system according to claim 1, wherein the access point indicates information of the real person or an image of the real space around the first real position.

3. The space coupling system according to claim 2, wherein the processing circuitry is further configured to, in response to accessing of the access point by the virtual person, display or project the information regarding the virtual person on the screen such that the real person and the virtual person are able to communicate with each other.

4. The space coupling system according to claim 2, wherein the processing circuitry is configured to display or project the image of the virtual space around the access point on the screen, and when the virtual person shown in the image on the screen is designated by the real person, the processing circuitry is further configured to display or project the information regarding the designated virtual person on the screen such that the real person and the virtual person are able to communicate with each other.

5. The space coupling system according to claim 2, wherein the first real position is the real position of the real person in the real space, the first virtual position is the virtual position associated with the real position of the real person in the real space, the access point is an avatar of the real person, and the processing circuitry is further configured to locate the avatar of the real person at the first virtual position in the virtual space.

6. The space coupling system according to claim 5, wherein the processing circuitry is further configured to:

acquire information on a pose of the real person in the real space; and apply the pose to the avatar of the real person.

7. The space coupling system according to claim 2, wherein the access point is a virtual screen, and the processing circuitry is further configured to:

display or project the image of the real space around the first real position on the virtual screen in the virtual space; and display or project the image of the virtual space around the virtual screen on the screen in the real space.

8. The space coupling system according to claim 1, wherein the following body is provided with a projector, and the processing circuitry is further configured to control the projector to project the information regarding the virtual person or the image of the virtual space around the access point onto the screen.

9. The space coupling system according to claim 1, wherein the screen is a mist screen formed by mist sprayed from the drone, and the mist screen is formed to cover around the real person.

10. The space coupling system according to claim 9, wherein the drone is provided with a projector, and the projector projects the information regarding the virtual person or the image of the virtual space around the access point from inside of the mist screen toward the mist screen.

11. The space coupling system according to claim 10, wherein the access point is an avatar of the real person.

12. A space coupling method for coupling real space with virtual space, the space coupling method being executed by a computer, wherein a real position in the real space and a virtual position in the virtual space are associated with each other, and the space coupling method comprises:

acquiring a first real position that is the real position of a real person in the real space or the real position of a screen configured to move following the real person;

acquiring a first virtual position that is the virtual position associated with the first real position and changing in conjunction with the first real position;

locating an access point, which is accessible by a virtual person in the virtual space, at the first virtual position in the virtual space;

displaying or projecting information regarding the virtual person or an image of the virtual space around the access point on the screen in the real space; and controlling a following body that moves following the real person in the real space, the screen being provided to follow the following body, and the following body being a drone.

\* \* \* \* \*